(12) United States Patent
Burr

(10) Patent No.: US 7,479,886 B2
(45) Date of Patent: Jan. 20, 2009

(54) ANTENNA CAPACITANCE FOR ENERGY STORAGE

(75) Inventor: Jeremy Burr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 329 days.

(21) Appl. No.: 11/510,046

(22) Filed: Aug. 25, 2006

(65) Prior Publication Data

US 2008/0055092 A1    Mar. 6, 2008

(51) Int. Cl.
*G08B 13/14* (2006.01)

(52) U.S. Cl. .................................... 340/572.7

(58) Field of Classification Search ............. 340/572.7, 340/572.8, 693.1, 572.1, 646; 343/700 R, 343/793

See application file for complete search history.

(56) References Cited

U.S. PATENT DOCUMENTS 6,546,795 B1 *  4/2003  Dietz ..................... 73/290 R
7,327,257 B2 *  2/2008  Posamentier ............. 340/572.1

OTHER PUBLICATIONS

U.S. Appl. No. 11/443,592, filed May 30, 2006—Pellerano et al—Non-backscatter passive RFID.

* cited by examiner

*Primary Examiner*—Phung Nguyen
(74) *Attorney, Agent, or Firm*—John F. Travis

(57) ABSTRACT

Various embodiments of the invention may include an antenna for a wireless device, the antenna operable to store electrical energy received from a power source. The stored electrical energy may then be used to power the circuitry of the device. Storing electrical power in this manner may allow the device to temporarily continue operating when the incoming harvested energy becomes too weak to instantaneously provide all the power needed to continue operating the device. In some embodiments the wireless device is a radio frequency identification (RFID) tag.

17 Claims, 5 Drawing Sheets

ANTENNA CAPACITANCE FOR ENERGY STORAGE

BACKGROUND

Many devices obtain their electrical operating power from a source with irregular availability, but must be able to operate even when the source is providing no power or insufficient power. Similarly, some devices occasionally require a short burst of increased electrical power that their normal power source is unable to supply. Although rechargeable batteries with a battery charger can be used for some of these applications, batteries are unfeasible for many other applications, due to cost, size, weight, or other considerations. Passive radio frequency identification (RFID) tags are one example of such devices. They get their operating power by harvesting a portion of the energy received through their antenna from a nearby transmitting wireless device, and the harvested energy is sufficient to operate the tag's circuit. The RFID tag works well when the incoming signal is strong, but may be unreliable when the incoming signal is weak or erratic, and the tag stops completely when the incoming signal stops and thereby denies the tag its source of power. Temporarily storing excess energy for use when it's needed would be very beneficial, but batteries are impractical for use in most RFID tags, and the circuitry may be much too small to contain a storage capacitor of the required size.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1A:
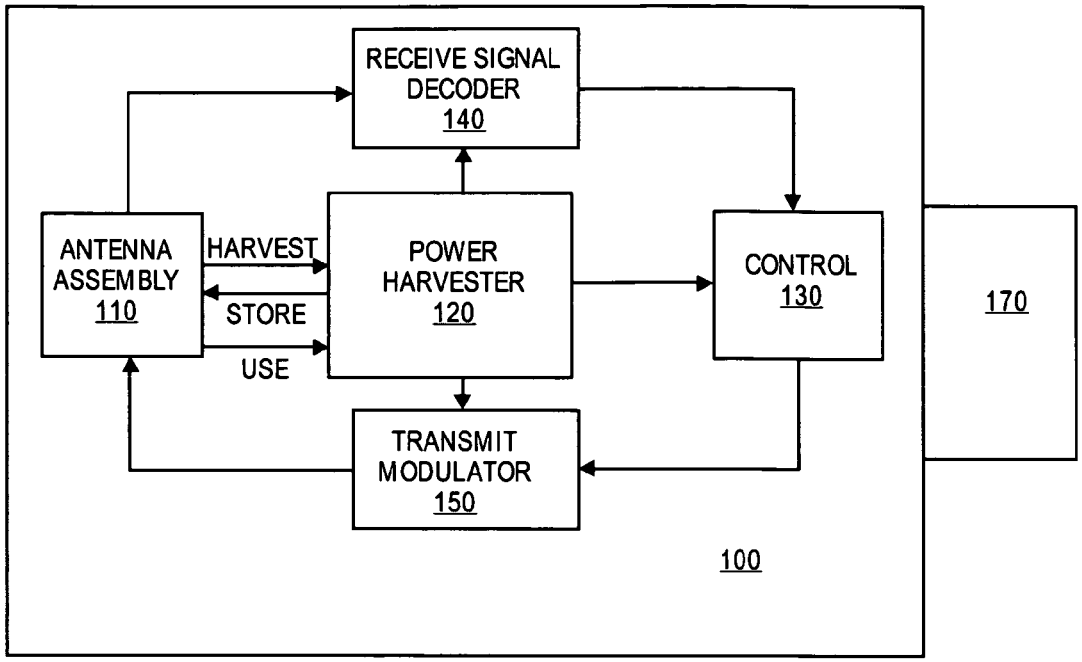
FIG. 1A shows a block diagram of an RFID tag that stores harvested RF energy in its antenna, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Within the context of this document, an RFID tag (sometimes referred to as an RFID transponder) may be defined as comprising an RFID antenna (to receive an incoming wireless signal that serves to activate the RFID tag, and to transmit a wireless response in the form of a modulated radio frequency signal), and an RFID tag circuit (which may include circuitry to store an identification code for the RFID tag, and circuitry to transmit that code through the antenna). A passive RFID tag is an RFID tag that harvests its operating energy from a signal received through its antenna (e.g., instead of getting that energy from a battery). The RFID tag circuit and/or the RFID antenna may be in a standalone package, or may be incorporated in a package with other circuitry (e.g., on a printed circuit board or in a semiconductor die containing other circuitry). As is known in the field of RFID technology, "transmitting" a signal from an RFID tag may include either: 1) providing sufficient power to the antenna to generate a signal that radiates out from the antenna, or 2) reflecting a modulated version of the received signal. Within the context of this document, an RFID reader is a device that wirelessly transmits a signal to the RFID tag to cause the RFID tag to wirelessly transmit a response, which may in turn be received by the RFID reader to identify the RFID tag.

As used in the claims, unless otherwise specified the use of the ordinal adjectives "first", "second", "third", etc., to describe a common object, merely indicate that different instances of like elements are being referred to, and are not intended to imply that the elements so described must be in a given sequence, either temporally, spatially, in ranking, or in any other manner.

In some embodiments of the invention, the antenna of a wireless device may be configured as a capacitor to store electrical energy, which may then be used to provide operating power for the device. Using this technique, the device may continue to operate for some period of time after the power from the power source either stops or becomes too weak to provide sufficient immediate operating power.

FIG. 1A shows a block diagram of an RFID tag that stores harvested RF energy in its antenna, according to an embodiment of the invention. In the illustrated embodiment, RFID tag 100 may contain an antenna assembly 110 to receive a radio frequency (RF) signal from another device (such as an RFID reader, not shown), a control circuit 130 to control operations of the RFID tag 100, a power harvester circuit 120 to accumulate a portion of the electrical energy from the received RF signal and provide it for operating the RFID tag 100, and a transmit modulator circuit 150 to convert a digital signal into a signal form suitable for transmitting through the antenna assembly. In some embodiments the RFID tag 100 may also include a receive signal decoder circuit 140 to decode a modulation in the received signal, so that the RFID tag 100 may wirelessly receive data. This received data may be used for various purposes, such as but not limited to: 1) recognize when this particular RFID tag is being addressed, so that signals addressed to other RFID tags may be ignored, 2) receive data for storage in the RFID tag, to be used for various purposes, 3) etc. The antenna assembly 110 may also be arranged such that at least one of its elements is configured as a capacitor, so that a portion of the harvested electrical energy in the power harvester circuit 120 may be stored in the capacitor of the antenna assembly 110, and subsequently used as a power source to operate the rest of the RFID tag 100.

RFID tags are generally used to wirelessly identify another object. The RFID tag may be attached to an object 170 (for example, a pallet of consumer merchandise in a store). When an RFID reader reads the RFID tag's identification number, a database in a computer system may associate that particular object 170 with that identification number, and the computer system will therefore be able to identify what the object is and know that the object is in close proximity to the reader. This information may in turn be used for many purposes, such as but not limited to inventory control, location identification, asset verification, etc.

Figure 1B:
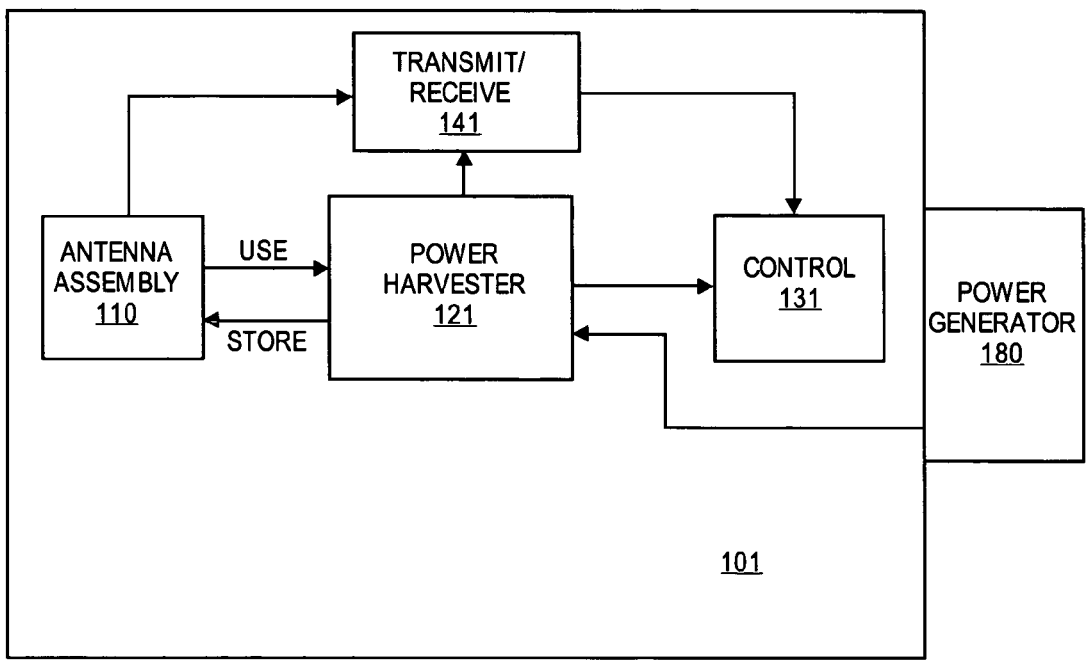
FIG. 1B shows a block diagram of a wireless device that stores received electrical power in its antenna, according to an embodiment of the invention.

FIG. 1B shows a block diagram of a wireless device that stores harvested electrical power in its antenna, according to an embodiment of the invention. The device 101 may have a transmit and/or receive circuit 141 to control radio communications through the antenna, a control circuit 131, and a power harvester circuit 121. In this embodiment, electrical power may be harvested from a source other than an RF signal received by the antenna. The power source is shown as power generator 180. Power generator 180 may be any feasible power source that provides electrical energy, and may be a device that converts another type of energy into electrical energy. Such a power source may include, but is not limited to, one or more of the following technologies: 1) solar power, 2) inductive energy, 3) electrostatic charge, 4) mechanical vibration, 5) a rotating mass, 6) sonic energy, 7) thermal gradients, 8) radioactive decay, 9) chemical, 10) etc. This electrical energy may be harvested by power harvesting circuit 121 and at least a part of the harvested energy may be stored in the capacitive element(s) of antenna assembly 110. In some embodiments, harvested power may be used directly to power the operations of the device 101, while any excess power above that needed for operations may be stored in the capacitive element(s) of the antenna. If the harvested power then drops below the amount needed for such operations, the power stored in the capacitive element(s) of the antenna may be used to supplement the harvested power. In other embodiments, the power stored in the capacitive elements of the antenna assembly may be used to fully power the device when there is no power coming from the power source.

Figure 2:
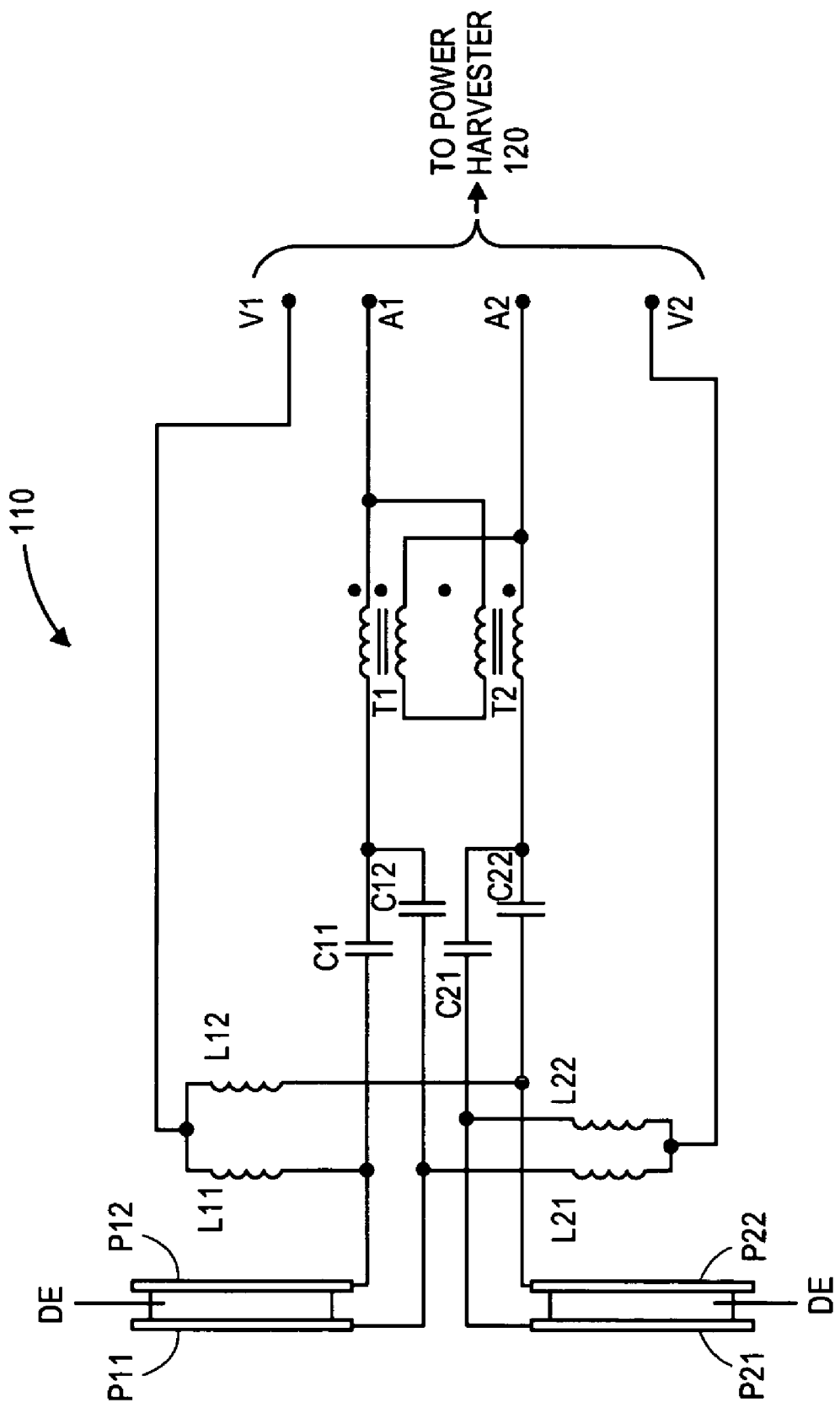
FIG. 2 shows an antenna assembly, according to an embodiment of the invention.

FIG. 2 shows an antenna assembly, according to an embodiment of the invention. The illustrated embodiment may be, for example, the antenna assembly 110 of FIG. 1A or 1B. The term 'assembly' is used in this context to indicate that the antenna may include more than just electrically conductive components of the desired size and shape, and may in fact include such things as the illustrated capacitive and inductive components to provide the proper AC and DC performance. The term 'assembly' is not intended to imply any particular arrangement of parts or method of manufacturing, and the illustrated embodiment is not intended to imply any particular points of connection and/or disconnection in the final device.

The illustrated embodiment shows a dipole antenna with two antenna elements, although the novel concepts shown here may be applied to other types of antennas. The first antenna element may include two segments (P11, P12) of conductive material (such as metal) with a dielectric material DE sandwiched between them, so that this combination forms an electrical capacitor. The segments P11 and P12 may be close enough together so that if they receive an RF signal, the signals perceived by each of the two elements will be approximately in phase (at least in phase sufficiently for the RF circuitry to operate properly). The second antenna element may be similar, with two segments (P21, P22) of conductive material with a dielectric material DE sandwiched between them to form another electrical capacitor. In some embodiments, the first and second antenna elements will have virtually identical performance characteristics to each other.

The capacitors formed in the antenna elements may be used to store an electrical charge, which in turn may provide a DC voltage to power the circuitry of device 100 or 101. Although a conventional device may receive sufficient energy from its power source to power its own circuitry under normal operating conditions, the charge stored in the antenna elements may be considered a reserve source of power. This reserve power may provide things such as, but not limited to: 1) temporary supplemental power to cover those periods when the primary power source is not providing enough instantaneous power, 2) power to permit the device to continue operating for some period of time after power from the power source stops, 3) extra power to handle temporary surges in electrical demand, 4) etc.

To handle this dual mode functionality (i.e., AC performance characteristics at RF frequencies to handle normal RF antenna functions, and DC performance characteristics to store and provide operating power), some embodiments of the antenna assembly may have two sets of inputs/outputs. Contacts A1, A2 may provide a connection for RF signals, while contacts V1, V2 may provide a connection for electrical power. In the case of an RFID tag, contacts A1, A2 may provide a connection to RFID tag circuitry for RF signals, as well as an input to the power harvesting circuit 120, which may rectify the received signal and accumulate electrical charge. In some embodiments these connections may duplicate the antenna connections of a conventional RFID tag. Once power has been harvested by the power harvesting circuit 120, a portion of that power may be provided by the power harvesting circuit 120 to contacts V1, V2, so that this electrical power may be stored in the capacitive antenna elements formed by P11, P12 and by P21, P22. Conversely, the power stored in the antenna elements may be provided to the RFID tag circuit through contacts V1, V2. In some embodiments, if the voltage from the harvested power is greater than the voltage stored in the capacitive antenna elements, then charge will flow into the capacitive antenna elements through V1, V2 and be held for potential future use. Conversely, if the voltage from the harvested power is less than the voltage stored in the capacitive antenna elements, then charge may flow out of the capacitive antenna elements through V1, V2 and into the RFID tag circuitry for operational use.

To isolate the DC characteristics from the AC characteristics in antenna assembly 110, various reactive components such as capacitors, inductors, and/or transformers may be used (in addition to the aforementioned capacitive antenna elements). For example, capacitors C11, C12 may prevent stored charge from draining directly between P11 and P12. At the same time, capacitors C11, C12 may pass RF signals from P11, P12 to A1, permitting normal RF operation from the antenna element to the RFID tag circuitry. Capacitors C21, C22 may provide similar functionality for P21, P22, and A2. Inductor L11 may permit a slowly changing DC voltage to pass between P12 and V1, while effectively blocking RF signals from passing between those same two points. Inductor L21 may perform the same functions for P11 and V2. Inductors L12 and L22 may perform similar functions for the antenna element containing P21, P22.

Thus, this combination of capacitors and inductors may be used to prevent RF signals from passing through the power contacts V1, V2, and/or to prevent DC voltage from flowing through the RF contacts A1, A2. Some embodiments may also contain impedance matching components between the antenna and the power harvesting circuitry. For example, a balun transformer T1, T2 may be used to match the balanced impedance of the antenna with the unbalanced impedance of the power harvesting circuitry 120. Other embodiments may use other techniques.

For a device such as that in FIG. 1B, in which the power harvesting circuit 121 harvests its power from some place other than RF signals received through the antenna, the antenna assembly may be similar to that of FIG. 2 except that the RF connections A1, A2 may not be connected directly to the power harvesting circuit as they are in an RFID tag.

Figure 3:
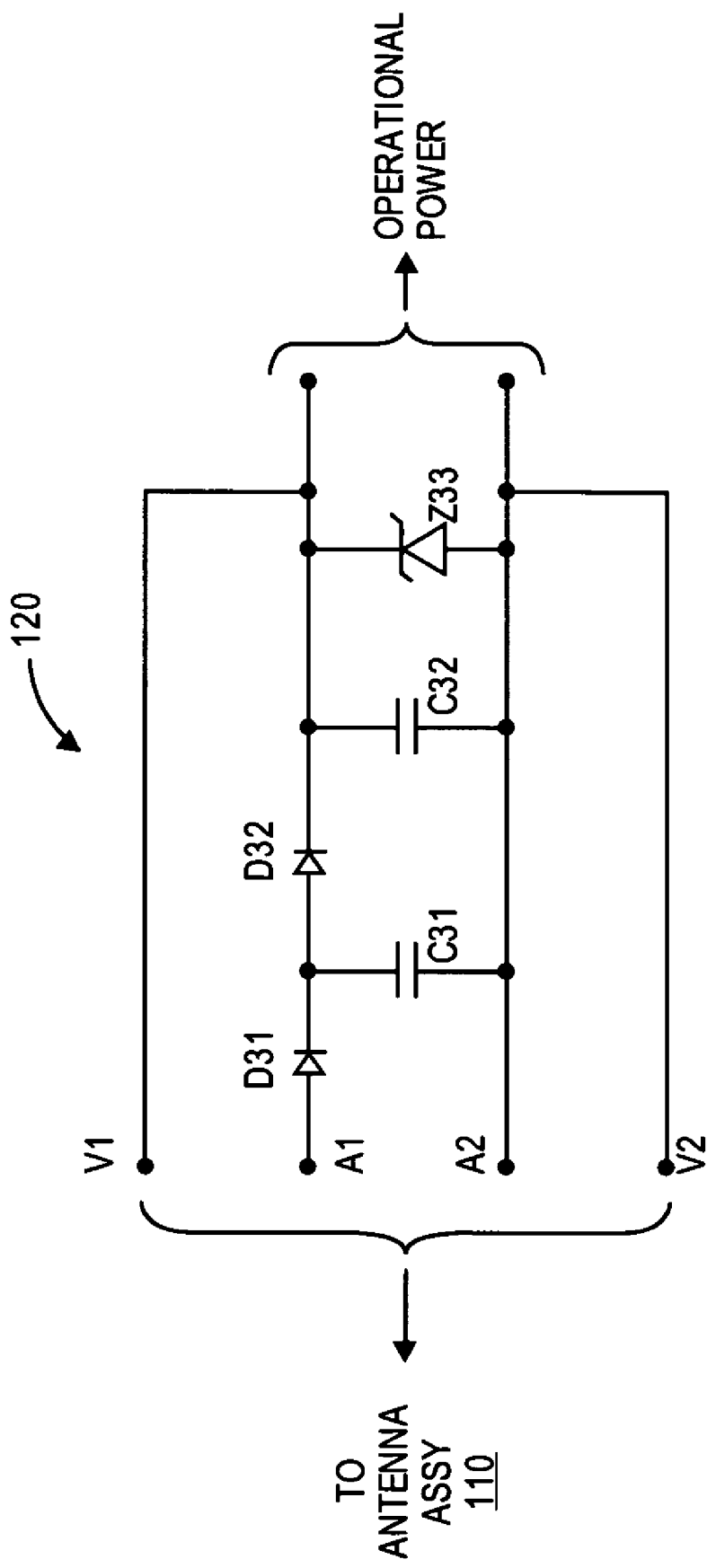
FIG. 3 shows a power harvesting circuit, according to an embodiment of the invention.

FIG. 3 shows a power harvesting circuit, according to an embodiment of the invention. In the illustrated embodiment of circuit 120, an RF signal from the antenna assembly may be input through contacts A1, A2. (Note: A1, A2, V1, and V2 are described herein as 'contacts' to provide convenient points of continuity between the illustrations of FIG. 2 and FIG. 3. Although these might be physically separable points of electrical contact in the case of a detachable antenna assembly, such a configuration should not be construed unless specifically described. Further, any such physically separable points of electrical contact might be located in places other than shown.) When the RF signal is polarized in one direction, current may pass through diode D31 and charge up capacitor C31. When the RF signal is polarized in the opposite direction, diode D31 may prevent capacitor C31 from discharging through that same path. Thus, the incoming RF signal may cause a DC voltage to build up across capacitor C31. The charge in capacitor C31 may discharge into a second stage of this circuit, including diode D32 and capacitor C32, causing a DC voltage to build up across C32, while preventing C32 from discharging into C31 if the voltage across C31 begins to fall. The voltage across C32 may provide an operating voltage for the device 100 or 101. A zener diode Z33 may clamp this accumulated voltage at a maximum level to prevent overvoltage conditions. Other components (not shown) may be used to further refine the operation of the power harvesting circuit. The operating voltage may also be provided at contacts V1, V2 to charge up the capacitive antenna elements previously described for FIG. 2. Conversely, if the voltage across C31 drops (for example, if the incoming power stops or becomes too weak), the stored charge in the antenna may flow back through V1, V2 to provide a suitable operating voltage for the device. Although the illustrated embodiment shows C32 and the antenna capacitive elements in parallel, some embodiments may eliminate C32 (or its equivalent) and use only the capacitive antenna elements at this stage. Although the illustrated embodiment shows a particular power harvesting circuit designed to harvest energy from an AC power source, other embodiments may use any feasible power harvesting circuit.

For a device such as that in FIG. 1B, in which the power harvesting circuit 121 harvests its power from some place other than RF signals received through the antenna, the connections A1, A2 in FIG. 3 may be connected to the power generator 180 rather than to the antenna.

Figure 4:
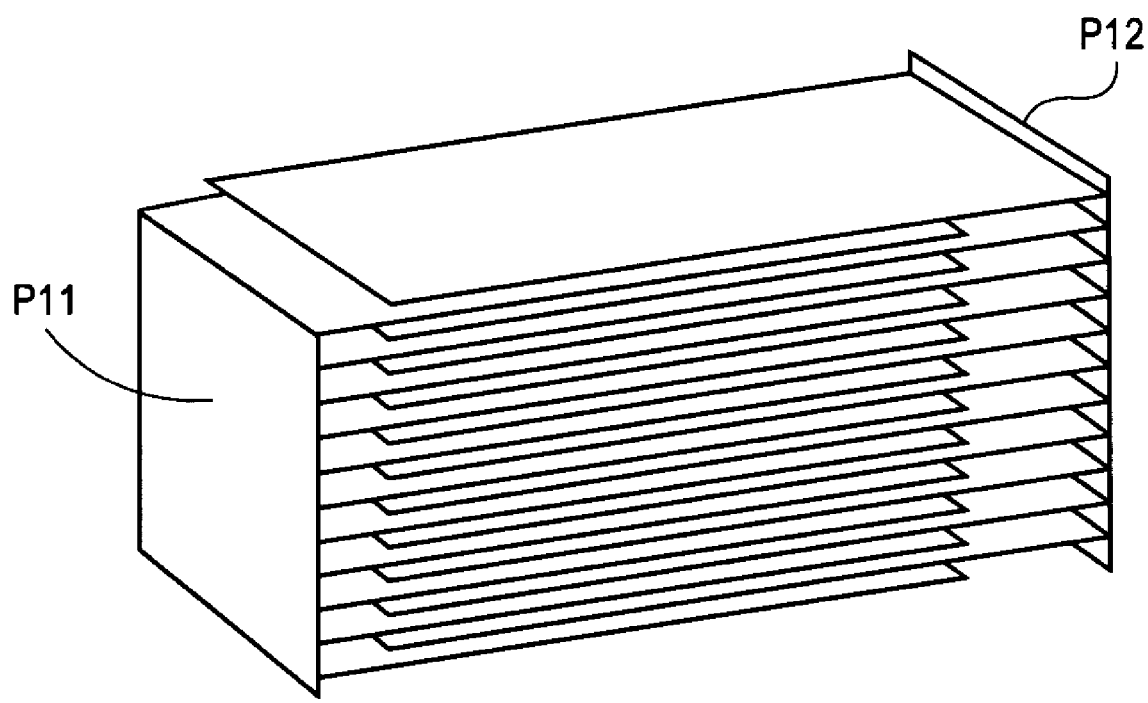
FIG. 4 shows a particular capacitor configuration, according to an embodiment of the invention.

The antenna elements of the antenna assembly may take any feasible form that provides both suitable RF operation and sufficient DC charge storage. In one example, a series of alternating overlapping layers may be deposited on a substrate, with a dielectric material between them, to create a relatively large capacitance while covering a relatively small area on the substrate. FIG. 4 shows a particular capacitor configuration, according to an embodiment of the invention. In the example shown, capacitive element P11 (see FIG. 2) may be made up of several layers of conductive material that are electrically connected to each other, while P12 may similarly be made up of several layers of conductive material that are electrically connected to each other. P11 and P12 may be arranged in alternating layers, with a dielectric material between. For simplicity of illustration, the overall shape of the antenna is shown as a rectangle, but in actual practice the shape of the antenna may take any feasible form that provides the right operating and packaging characteristics.

Figure 5:
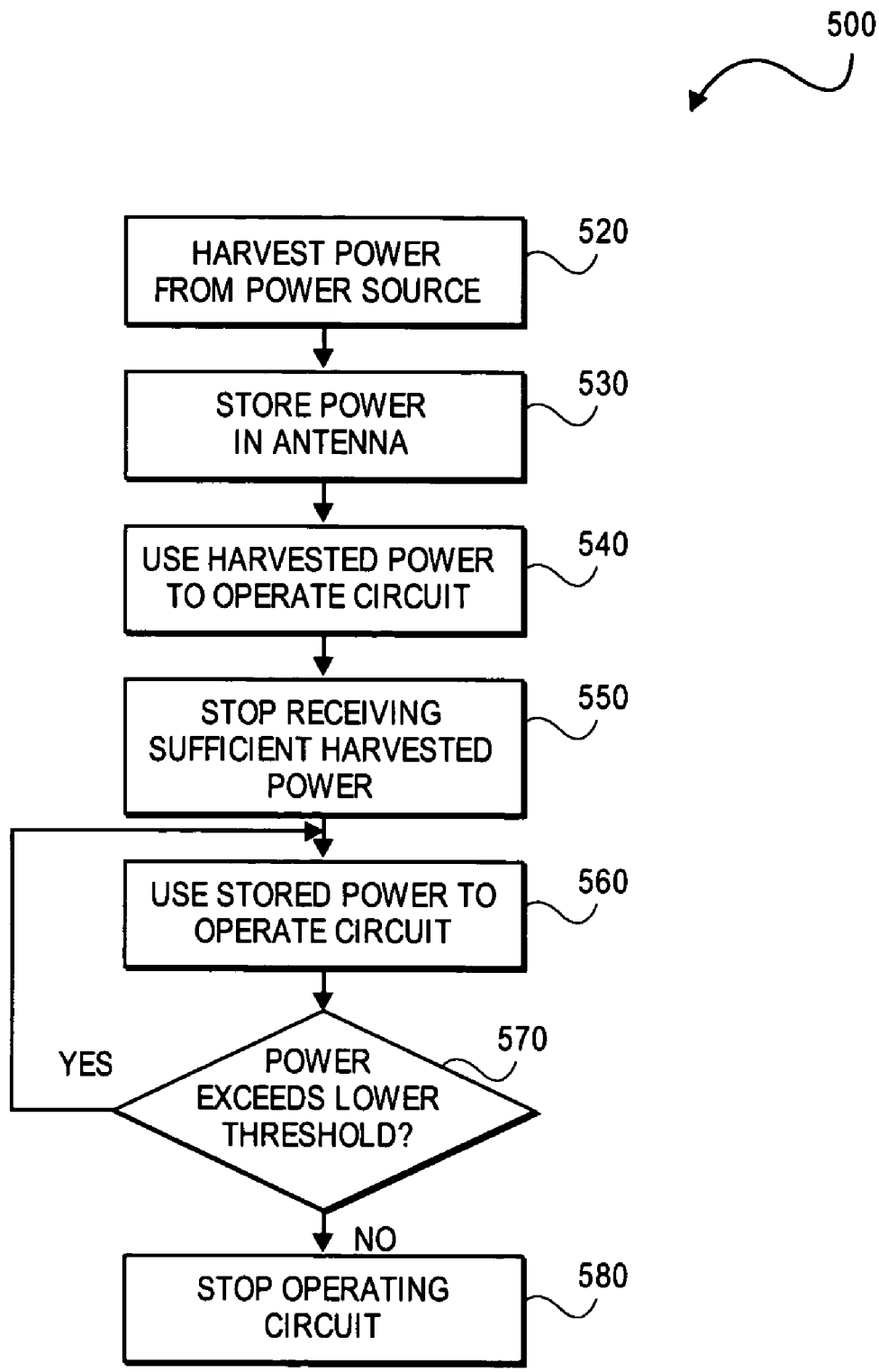
FIG. 5 shows a flow diagram of a method of operating a device with an antenna-based capacitor, according to an embodiment of the invention.

FIG. 5 shows a flow diagram of a method of operating a device, according to an embodiment of the invention. In flow diagram 500, at 520 power may be harvested from a power source. In some embodiments the power source may be an RF signal received through the device's antenna. In other embodiments, the power source may be any feasible power source, such as but not limited to: 1) solar cells, 2) an inductive generator, 3) a rotating generator, 4) a mechanical vibration converter, 5) an electrostatic charge accumulator, 6) a sonic energy converter, 7) a thermal gradient converter, 8) a radioactive decay converter, 9) chemical converter, 10) etc. At 530, at least a portion of this harvested electrical power may be stored in the capacitive antenna elements of the device's antenna. Once sufficient electrical energy has been stored (which in some embodiments may be indicated by the voltage level of the accumulated charge), the harvested electrical energy may be used as a power source to operate the circuitry of the device at 540. Some embodiments may include a voltage threshold detector (not shown in the figures) to prevent the circuitry from trying to operate until the accumulated charge reaches a pre-determined voltage level. 'Operating' may include such things as operating digital circuitry in the device, and in some cases may include transmitting and/or receiving a wireless signal.

Once the device's circuits begin operating, the circuit may perform the actions that the device was designed to perform. In the case of an RFID tag, this might include such things as detecting whether the incoming RF signal is addressed to this RFID tag, transmitting the RFID tag's identification number if appropriate, and performing other functions that the RFID tag may be designed to perform. At some point the incoming harvested energy may no longer be sufficiently strong to continue providing operating power for the device, as indicated at 550. This may happen for various reasons. When this condition occurs, power to continue operating the circuitry may be supplied, at least partly, by the electrical charge stored in the capacitive antenna elements, as indicated at 560. As long as the stored electrical energy, in combination with any incoming harvested energy, is sufficient to power the circuitry, the device may continue operating. But if the power available from this combination drops below a pre-determined threshold, as indicated at 570, operation of the device may be stopped at 580. In some embodiments, this threshold may be indicated as a minimum voltage level, and may be set sufficiently high to avoid the possibility of potential errors in circuit operation that could occur if the operational voltage is marginal. This 'stop operation' voltage threshold may be the same, or may be different, than the 'start operation' threshold described earlier that starts the circuit operating.

Some embodiments of the described invention may be used to permit an RFID tag to continue operating during periods when the received RF signal from the RFID reader is too weak to provide sustained operating power to the RFID tag. Other embodiments may store sufficient energy to permit the RFID tag to delay transmitting a response until after the RFID reader has stopped transmitting a query, thus relieving the RFID reader from the task of separating a weak received signal from its own strongly transmitted signal at the same frequency.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising
a device for wireless communications, comprising:
an antenna;
an electronic circuit coupled to the antenna;
a power harvesting circuit coupled to the antenna, the power harvesting circuit to obtain electrical energy from a power source;
wherein the antenna is operable as a capacitor to store at least a portion of the electrical energy harvested by the power harvesting circuit, and to provide at least a portion of the stored electrical energy as operating power to the electronic circuit.

2. The apparatus of claim 1, wherein the antenna comprises a dipole antenna.

3. The apparatus of claim 1, wherein an element of the antenna comprises two layers of conductive material separated by a dielectric material.

4. The apparatus of claim 3, wherein the antenna comprises capacitive coupling between the element and an antenna input of the electronic circuit.

5. The apparatus of claim 1, wherein the electronic circuit is part of a radio frequency identification (RFID) tag.

6. The apparatus of claim 5, further comprising an object connected to the RFID tag, the object to be identified by an identification number contained in the RFID tag circuit.

7. An apparatus, comprising
an antenna assembly for connection to a device for wireless communications, the antenna assembly comprising:
a first antenna element having a dielectric material between a first electrical conductor and a second electrical conductor to form a first electrical capacitor to store electrical energy to operate the device;
a first set of electrical contacts to couple a radio frequency (RF) signal from the first antenna element to a set of antenna connections of the device; and
a second set of electrical contacts to couple the first electrical capacitor to a set of power connections of the device.

8. The apparatus of claim 7, further comprising a second antenna element having a dielectric material between a third electrical conductor and a fourth electrical conductor to form a second electrical capacitor to store the electrical energy to operate the device.

9. The apparatus of claim 7, wherein the antenna assembly further comprises a balun transformer to match an impedance of the antenna assembly to an impedance of the device.

10. The apparatus of claim 7, wherein the antenna assembly further comprises a capacitor circuit to block direct current from draining from the first electrical capacitor to the first set of electrical contacts.

11. The apparatus of claim 7, wherein the first antenna element comprises multiple layers of the first conductor interspersed between multiple layers of the second conductor, with the dielectric material between the multiple layers of the first conductor and the multiple layers of the second conductor.

12. The apparatus of claim 7, wherein the device is to include a radio frequency identification (RFID) tag circuit.

13. The apparatus of claim 7, further comprising a RFID tag circuit coupled to the antenna assembly.

14. A method, comprising:
receiving electrical energy from a power generating source;
storing at least a portion of the received electrical energy in an antenna element configured as a capacitor; and
providing at least a portion of the stored electrical energy as electrical power to operate circuitry that controls wireless communications through the antenna.

15. The method of claim 14, wherein all operating power for the circuitry is obtained from said receiving, said storing, and said providing.

16. The method of claim 14, wherein said receiving comprises receiving the electrical energy from a power generating source that does not include a battery.

17. The method of claim 16, wherein:
said receiving comprises receiving the electrical energy as radio frequency signals through the antenna; and
said providing comprises providing the stored electrical energy to a radio frequency identification (RFID) tag circuit.

* * * * *